United States Patent [19]

Tanaka

[11] Patent Number: 4,478,504
[45] Date of Patent: Oct. 23, 1984

[54] ELECTROSTATIC RECORDING APPARATUS

[75] Inventor: Atsuyuki Tanaka, Toyohashi, Japan

[73] Assignee: Minolta Camera Kabushiki Kaisha, Osaka, Japan

[21] Appl. No.: 451,712

[22] Filed: Dec. 20, 1982

[30] Foreign Application Priority Data

| Dec. 22, 1981 | [JP] | Japan | 56-208806 |
| Dec. 25, 1981 | [JP] | Japan | 56-210355 |
| Dec. 25, 1981 | [JP] | Japan | 56-210356 |
| Apr. 26, 1982 | [JP] | Japan | 57-70818 |
| Apr. 27, 1982 | [JP] | Japan | 57-71706 |

[51] Int. Cl.³ .................................................. G03G 15/00
[52] U.S. Cl. ..................................................... 355/1; 355/8
[58] Field of Search ................... 355/1, 3 R, 8; 354/5, 354/6, 7, 12, 13, 18, 19; 346/29, 107 R, 108, 139 R

[56] References Cited

U.S. PATENT DOCUMENTS

| 3,750,189 | 10/1971 | Fleischer. | |
| 3,946,403 | 3/1976 | Ikeuchi et al. | |
| 4,008,954 | 2/1977 | Ogawa et al. | 355/1 |
| 4,033,687 | 7/1977 | Hirayama et al. | 355/1 |
| 4,141,641 | 2/1979 | Nagai et al. | 355/1 |
| 4,164,683 | 8/1979 | Nakamura et al. | |
| 4,342,504 | 8/1982 | Ebner. | |
| 4,353,636 | 10/1982 | Kojima. | |

Primary Examiner—A. C. Prescott
Attorney, Agent, or Firm—Jackson, Jones & Price

[57] ABSTRACT

Disclosed herein is an electrostatic recording apparatus which comprises:
a fluorescence generation tube having a plurality of small-sized light emission segments aligned on a substrate;
an image-forming optical system for focusing light emitted from said light emission segments on the surface of a photosensitive member and forming an electrostatic image on said surface of the photosensitive member; and
a plurality of driving circuits for controlling light emission of the light emission segments in response to image signals fed thereto.

16 Claims, 16 Drawing Figures

ELECTROSTATIC RECORDING APPARATUS

FIELD OF THE INVENTION

The present invention relates to an electrostatic recording apparatus for forming electric images on a photosensitive member in response to optical signals fed from a fluorescence generation tube.

BACKGROUND OF THE INVENTION

In order to form printed images from electric image signals such as computer outputs or facsimile signals by utilizing an electronic photocopying process, it is necessary to convert said electric image signals into optical signals.

As means for obtaining the aforementioned optical signals for the electrostatic recording apparatus, there have been provided a means using a laser such as that disclosed in U.S. Pat. No. 3,750,189 and a means using a light emission diode (LED) array such as that disclosed in U.S. Pat. No. 4,342,504. However, when the laser is used, the recording apparatus should include relatively large-sized, complicated and expensive mechanisms such as a laser oscillator and a polygonal mirror and requires a highly accurate optical system, whereby it has heretofore been difficult to provide a small-sized and inexpensive printer. In the case of the LED array, in turn, a plurality of short LED array tips are arranged in a line since it is difficult to form the dense LED to have the length of, e.g., A4 size. The arrangement of the LED array tips requires high accuracy, and utilization of a plurality of the LED arrays results in complexity of the driving circuits for the LED arrays.

SUMMARY OF THE INVENTION

An essential object of the present invention is to provide an electrostatic recording apparatus which is small-sized and inexpensive in manufacturing cost.

Another object of the present invention is to provide an electrostatic recording apparatus comprising a fluorescence generation tube for converting electric image signals into optical signals.

A further object of the present invention is to provide an electrostatic recording apparatus using a fluorescence generation tube as a light source wherein said fluorescence generation tube and the circuit arrangement for driving the fluorescence generation tube can be mounted on a common substrate so that the size of the recording apparatus can be effectively decreased.

A still further object of the present invention is to provide a control device for use in an electrostatic recording apparatus using a fluorescence generation tube, wherein various circuit arrangement for driving the fluorescence generation tube can be mounted in a relatively small-sized substrate.

According to one aspect of the present invention, there is provided an electrostatic recording apparatus which comprises:

a fluorescence generation tube having a plurality of small-sized light emission segments aligned on a substrate;

an image-forming optical system for focusing light emitted from said light emission segments on the surface of a photosensitive member and forming an electrostatic image on said surface of the photosensitive member; and a plurality of driving circuits for controlling light emission of the light emission segments in response to image signals fed thereto.

Many other features, advantages and additional objects of the present invention will become manifest to those versed in the art upon making reference to the detailed description which follows and the accompanying sheets of drawings.

DESCRIPTION OF THE PREFERRED EMBODIMENT

Figure 1:
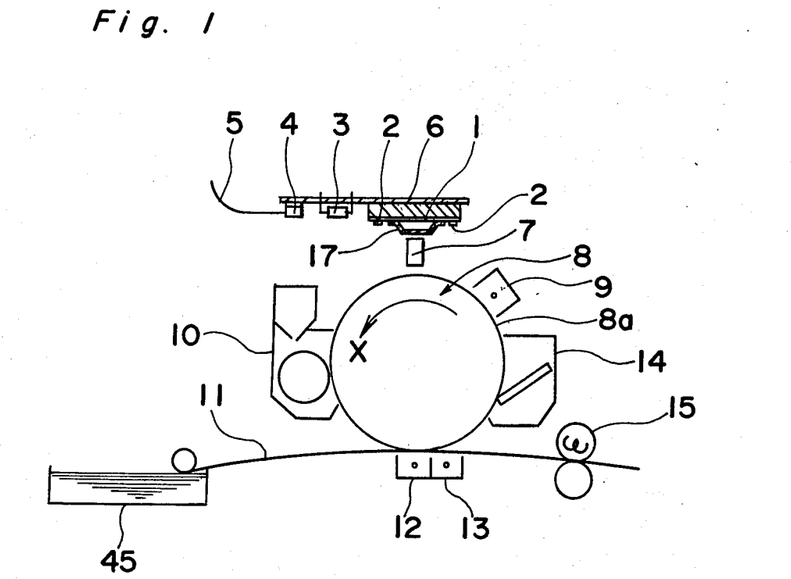
FIG. 1 is a cross sectional view showing an essential portion of an electrostatic recording apparatus according to the present invention.

In FIG. 1, the electrostatic recording apparatus comprises a fluorescence generation tube 1, ICs (integrated circuits) 2 functioning as driving circuits for controlling emission of the light from light emission segments of the fluorescence generation tube 1 in correspondence to image signals representing images to be recorded, a clock interface circuit 3 for controlling the ICs 2 so as to input the image signals to the fluorescence generation tube 1, a plurality of connectors 4, a cable 5 having wires each of which is connected to an image signal generation circuit and a support plate 6. A focusing light transmission array 7 is provided confront to a face glass member 17 of the fluorescence generation tube 1 and functions as a focusing optical system for concentrating the light from the fluorescence generation tube 1 on the cylindrical surface 8a of a photosensitive drum 8. Said photosensitive drum 8 is provided with a photosensitive layer on its cylindrical surface 8a so that an electrostatic image can be developed on the cylindrical surface 8a in response to the light from the fluorescence generation tube 1. Around the photosensitive drum 8, there are provided a charger 9 for charging the photosensitive drum 8, a developing device 10, a transferring charger 11 for transferring the electrostatic image on the photosensitive drum 8 to a recording paper 11 passing the drum 8 with the cylindrical surface 8a being in contact with the paper 11, a de-energizing charger 13 for separating the recording paper 11 from the photosensitive drum 8 and a cleaner 14 for removing toner remaining on the photosensitive drum 8. The recording paper 11 is fed from a container 45 and discharged from the device through a fixation means 15. The photosensitive drum 8 is rotated in the direction as shown by an arrow X in FIG. 1.

Figure 2:
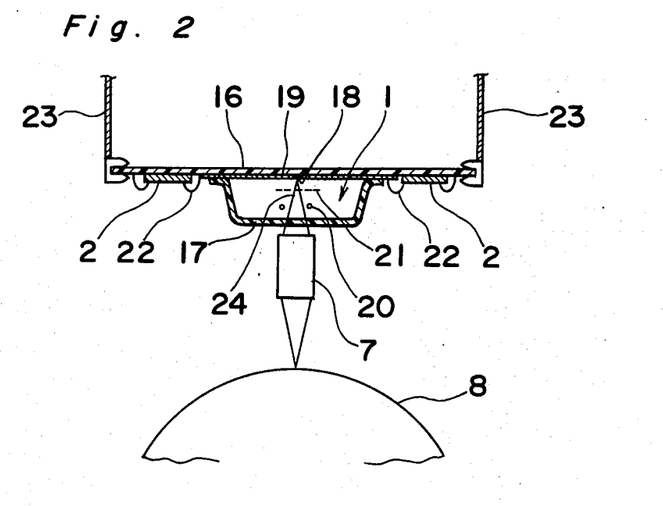
FIG. 2 is a vertical cross sectional view showing the vicinity of a fluorescence generation tube which is applied to the electrostatic recording apparatus of FIG. 1.
Figure 3:
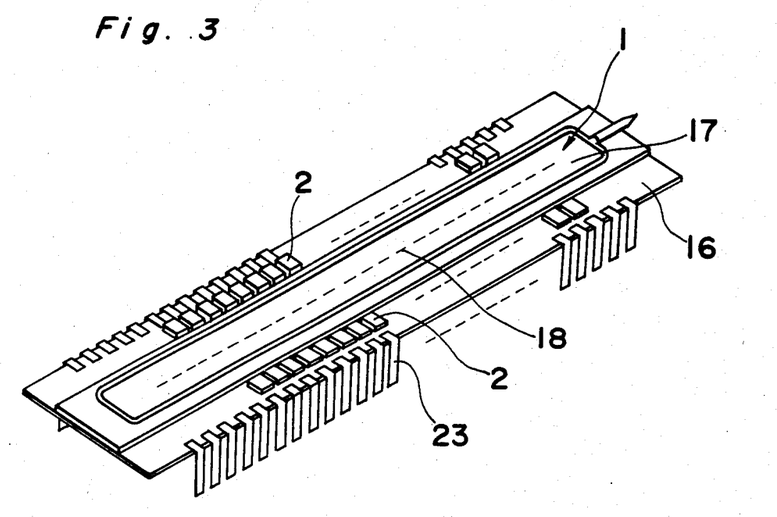
FIG. 3 is a perspective view roughly illustrating arrangement of the fluorescence generation tube and driving integrated circuits as shown in FIG. 1.
Figure 7:
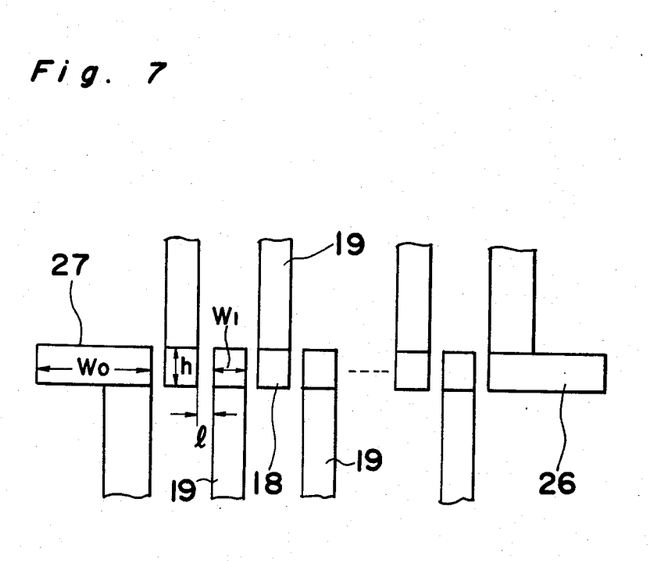
FIG. 7 is a schematic top plan view showing examples of the sizes of the light emission segments.

FIG. 2 is an enlarged cross sectional view showing the vicinity of the fluorescence, generation tube 1. The fluorescence generation tube 1 is disposed along the direction of the width of the photosensitive drum 8 and comprises a vacuum container consisting of a substrate 16 made of glass and a transparent face glass member 17, which contains anode segments 18 formed on the substrate 16 by vacuum evaporation, conductor lines or patterns 19, cathode filaments 20 provided above and along the anode segments 18 and grids 21 provided between the anode segments 18 and the cathode filaments 20. Each of the anode segments 18 is coated on its surface with a fluorescent substance mainly composed of zinc oxide (ZnO) to form a light emission segment 18. It is to be noted that the light emission segment is hereinafter indicated by the same reference numeral 18 as the anode segment. The light emission segments 18 are arranged in an array as shown in FIGS. 3 and 7 along the longitudinal direction of the fluorescence generation tube 1 with a space 1 (see FIG. 7). The conductor patterns 19 extend through the face glass member 17 to be connected by wire bonding at 22 with the ICs 2 positioned on the substrate 16 of the fluorescence generation tube 1. The ICs 2 are arranged on both sides of the fluorescence generation tube 1 along the longitudinal direction thereof, to be connected to the clock interface circuit 3 through lead terminals 23. The face glass member 17 is formed with a multilayer interference filter.

IC tips have hitherto been mounted on a substrate having conductor patterns distributed thereon by bonding the IC tips to the substrate by a die bonding method and then connecting input and output terminals of the IC tips with the conductor patterns by a wire bonding method.

According to conventional technique, however, conductor patterns are formed on a substrate excluding the regions on which the IC tips mounted on the substrate are bonded. Therefore, as the density of the IC tips mounted on the substrate gets higher and the number of the conductor patterns is increased, higher accuracy is required in the forming of the conductor patterns with respect to, e.g., electrical insulation between adjacent conductor patterns. Further, heat dissipation from the IC tips through the substrate may be lowered as density of the conductor patterns becomes high.

In the device according to the present invention, the aforementioned problems are solved by forming parts of the conductor patterns for supplying a predetermined power source in regions on which the IC tips are bonded on the substrate while making the substrates of the IC tips have the same potential of said predetermined power source.

Figure 4:
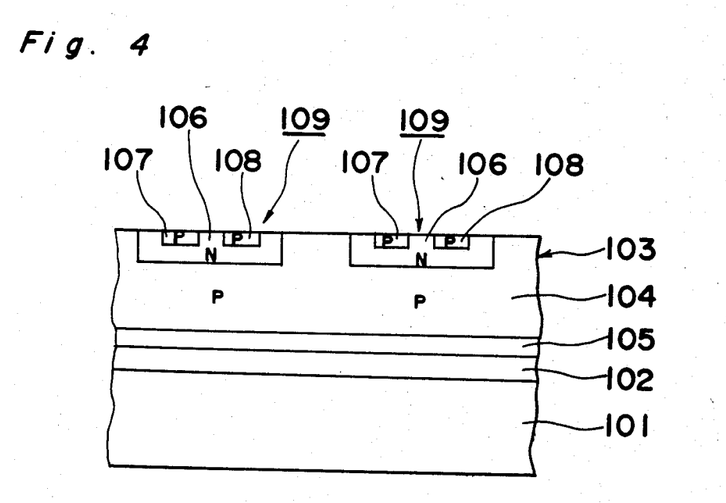
FIG. 4 is a partially fragmented cross sectional view showing the fluorescence generation tube mounted with IC tips.

FIG. 4 illustrates such an embodiment of the present invention, which comprises a substrate 101 made of, e.g., glass or resin, formed with conductor patterns 102 for supplying a predetermined power source (−25 V in this embodiment) and IC tips 103 bonded to the conductor patterns 102 (as shown in broken lines in FIG. 4) on the sides having substrates 104 through an adhesive 105. Each of the IC tips 103 includes a plurality of transistors 109 each comprising an N-type region 106 formed on a P-type substrate 104 functioning as a base of the transistor 109 in an epitaxial growth method and a pair of P-type regions 107 and 108 formed by diffusion of impurities on the N-type region 106 to function as an emitter and a collector respectively, and necessary circuit elements. The substrate 104 of the IC tip 103 is bonded with the conductor pattern 102 by a wire bonding method so that a predetermined power source is directly supplied to the substrate 104. In the embodiment shown in FIG. 4, a minus or negative terminal of a power source of −25 V is supplied to the substrate 104. A plus or positive terminal of a power source or a GND may be supplied thereto, however in that case, the construction of the transistor 109 must be changed so that a reverse bias voltage acts between the substrate 104 and the base region 106. The adhesive 105 may be prepared with an electrically insulating material such as a resin or an electrically conductive material. The conductor pattern 102 for supplying the predetermined power source may be prepared in the form of a thin layer by means such as vacuum evaporation of an electrically conductive metal, e.g., aluminum, followed by patterning so that the pattern 102 can be formed simultaneously with other conductor patterns.

Figure 5:
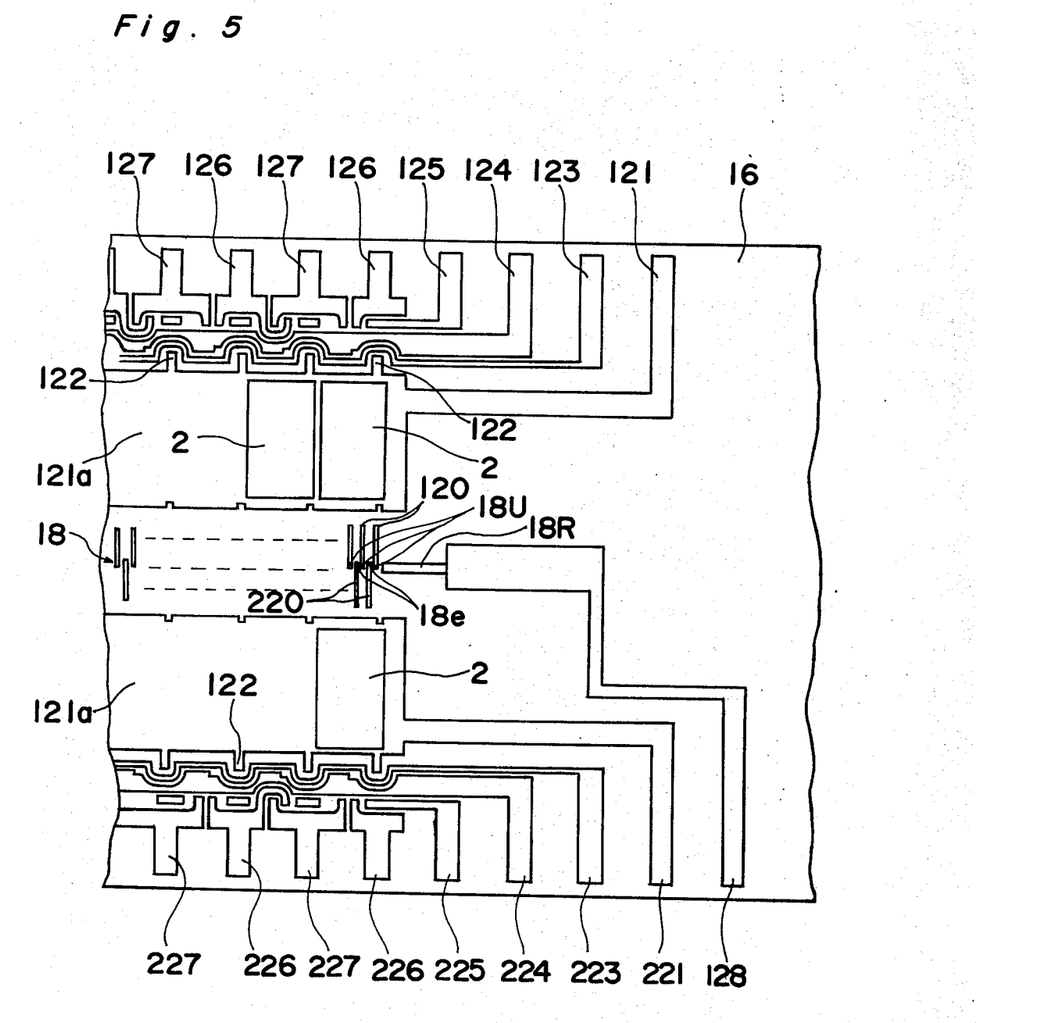
FIG. 5 is a top plan view of the substrate of the fluorescence generation tube showing conductor patterns.

FIG. 5 shows a part of the plan view of the device shown in FIG. 1 with the face glass member 7a omitted.

Shown in the drawing is an end of the substrate 16, on which the conductor patterns for ICs are formed on both sides of the light emission segments 18 which are arranged along the center line of the substrate 16. Conductor patterns 120 connected to uneven number light emission segments 18u extend in the upward direction while conductor patterns 220 connected to even number light emission segments 18e extend in the downward direction. A plurality of conductor patterns 121 through 127 formed above the light emission segments 18 are provided for the uneven number light emission segments 18u while a plurality of conductor patterns 221 through 227 formed in the lower side of the light emission segments 18 are provided for the even number light emission segments 18e. A conductor pattern 121 for supplying the minus power source has widened portions 121a on which the ICs 2 are bonded and includes a plurality of projections 122, one to every IC 2. Conductor patterns 123, 124 and 125 for signal lines for ICs 2 are respectively adapted to transmit latch signals, clock signals and data signals. Distribution patterns 126 for GND and conductor patterns 127 for supplying a plus power source are provided in the ratio of one to every two ICs 2 since a large current flows through these conductor patterns 126 and 127. A conductor pattern 128 functions to drive the light emission segments 18R existing on the rightmost end. A similar conductor pattern is provided for the leftmost end light emission segment (not shown). There are further provided power source supplying conductor patterns for the filaments 20 (see FIG. 2) and power source supplying conductor patterns for the grids 21.

In assembling such conductor patterns, the ICs 2 having the construction as shown in FIG. 4 are bonded to the widened portions of the minus power source supplying conductor patterns 121a by an insulating adhesive in positions as shown, and thereafter the projections 122 are connected with minus power supply terminals of the ICs 2 by a wire bonding method, and the conductor patterns 120, 123 to 127 are respectively connected with corresponding terminals of each of the ICs 2 by the wire bonding method.

In this embodiment of the fluorescence generation tube with the ICs 2 mounted in the aforementioned manner, even if the insulating adhesive is broken thereby allowing electric conduction between the ICs 2 and the conductor patterns 121, the ICs 2 are prevented from being damaged since the substrates of the ICs 2 and the conductor patterns 121 are kept at an identical voltage.

As a modification of the aforementioned embodiment, the insulating adhesive may be replaced by an electrically conductive bonding agent. Utilization of the electrically conductive bonding agent facilitates supply of the power source and improves reliability of the fluorescence generation tube since supply of the power source to the ICs is conducted through the wire bonding as well as the bonding agent.

The specific features described above are advantageous particularly in a case where the ICs and the light emission segments are mounted on the common substrate, and the embodiment described above can be further modified by utilizing as the light emission segments a light emission diode array or a plurality of minute shutters of liquid crystal arranged in the form of an array.

Operation

In a device shown in FIG. 2 which employs the substrate shown in FIG. 5, a normal voltage is applied to the cathode filaments 20 of the fluorescence generation tube 1 to heat the same so that thermions are radiated from the surfaces thereof while a positive voltage with respect to the cathode filament 20 is applied to the grids 21. Under this condition, image signals are inputted into the device from an external image signal generation circuit 28 shown in FIG. 13 and are controlled by the clock interface circuit 3 to be inputted into the ICs 2. The ICs 2 control the image signals line by line to apply to the selected light emission segments a positive voltage with respect to the cathode filaments 20. The thermions generated from the cathode filaments 20 are attracted by the grids 21 and accelerated to strike the light emission segments 18 which have been applied with the positive voltage, so that fluorescence is generated from the light emission segments 18 while an electric current flows toward the cathode filaments 20. In this embodiment, emission luminance of the fluorescence generation tube 1 can be increased up to about 2000 fL by voltage control between the grids 21 and the anode segments or light emission segments 18.

The light 24 emitted from the light emission segments 18 is transmitted through the face glass member 17 to enter the light transmission array 7 and is focused on the cylindrical surface of the photosensitive drum 8. Since the light 24 is inferior in monochromaticity, the multi-layer interference filter of the face glass member 17 functions to narrow the wavelength range thereof while transmitting the same, to prevent occurrence of chromatic aberration by the light transmission array 7.

On the other hand, the photosensitive drum 8 rotating in the direction of the arrow X is charged by the charger 9 and irradiated by the light 24 from the light emission segments 18 successively by lines to form an electrostatic latent image on the cylindrical surface of the photosensitive drum 8, and in turn the latent image can be developed by the developing device 10 to form a toner image on the cylindrical surface of the drum 8. Then the recording paper 11 fed from the container 45 is fitted on the toner image and the recording paper 11 is charged by the transferring charger 12 from the reverse surface so that the toner image is transferred from the surface of the photosensitive drum 8 to the surface of the recording paper 11. Thereafter the recording paper 11 is de-energized by the de-energizing charger 13 and removed from the photosensitive drum 8 to be forwarded into a fixation device 15 so that the toner image is fixated on the recording paper 11. Then the cleaner 14 removes the residual toner on the surface of the photosensitive drum 8 in preparation for the subsequent recording.

Explanation of the Fluorescence Generation Tube and Driving Circuit Arrangement Thereof FIG. 3 is a perspective view roughly illustrating the fluorescence generation tube 1 and the driving ICs 2 as shown in FIG. 1. The driving ICs 2 are arranged on the substrate 16 along the longitudinal direction on both sides of the exterior of the fluorescence generation tube 1.

Figure 6:
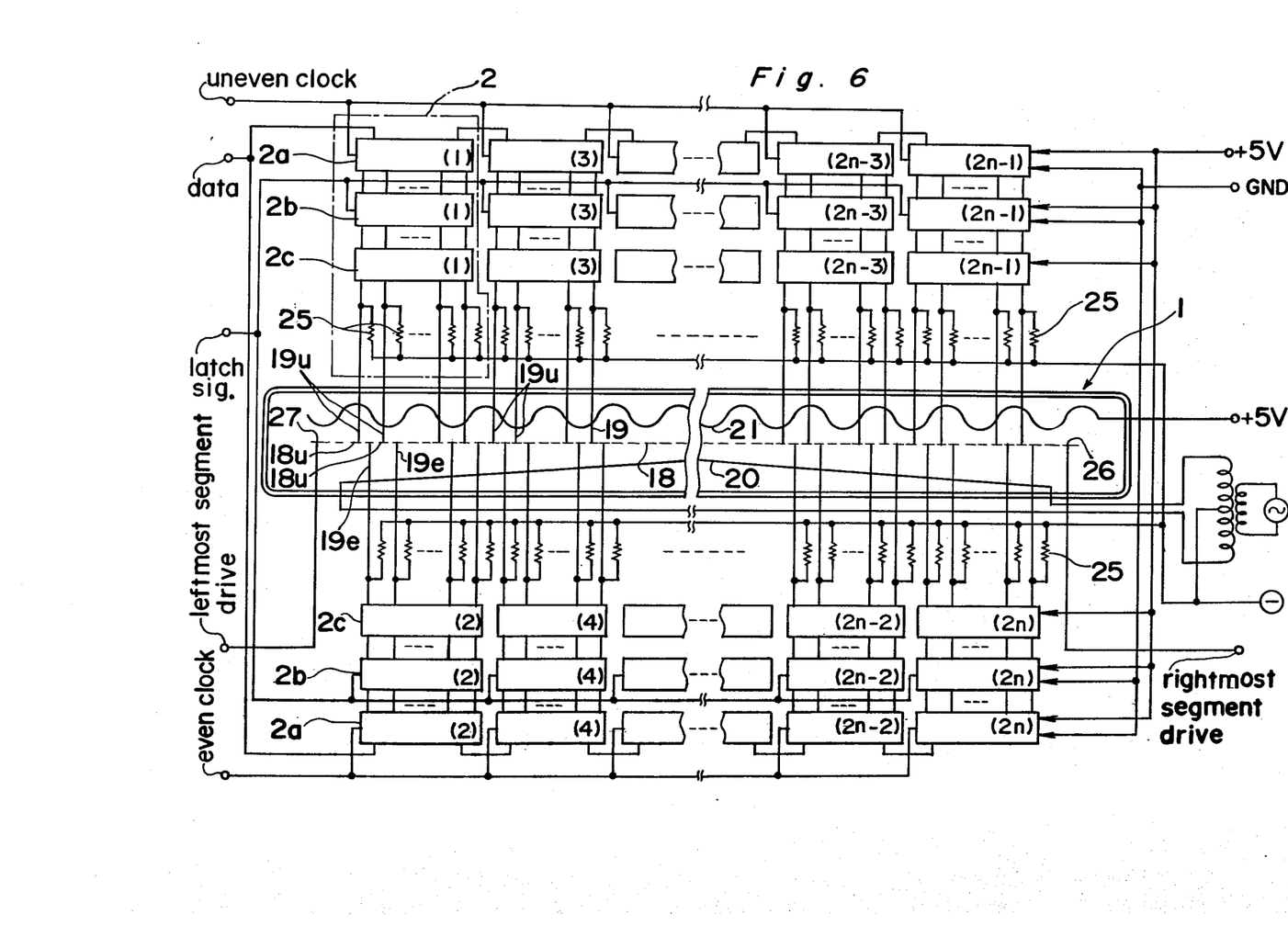
FIG. 6 is a block diagram showing the fluorescence generation tube and driving ICs.
Figure 16:
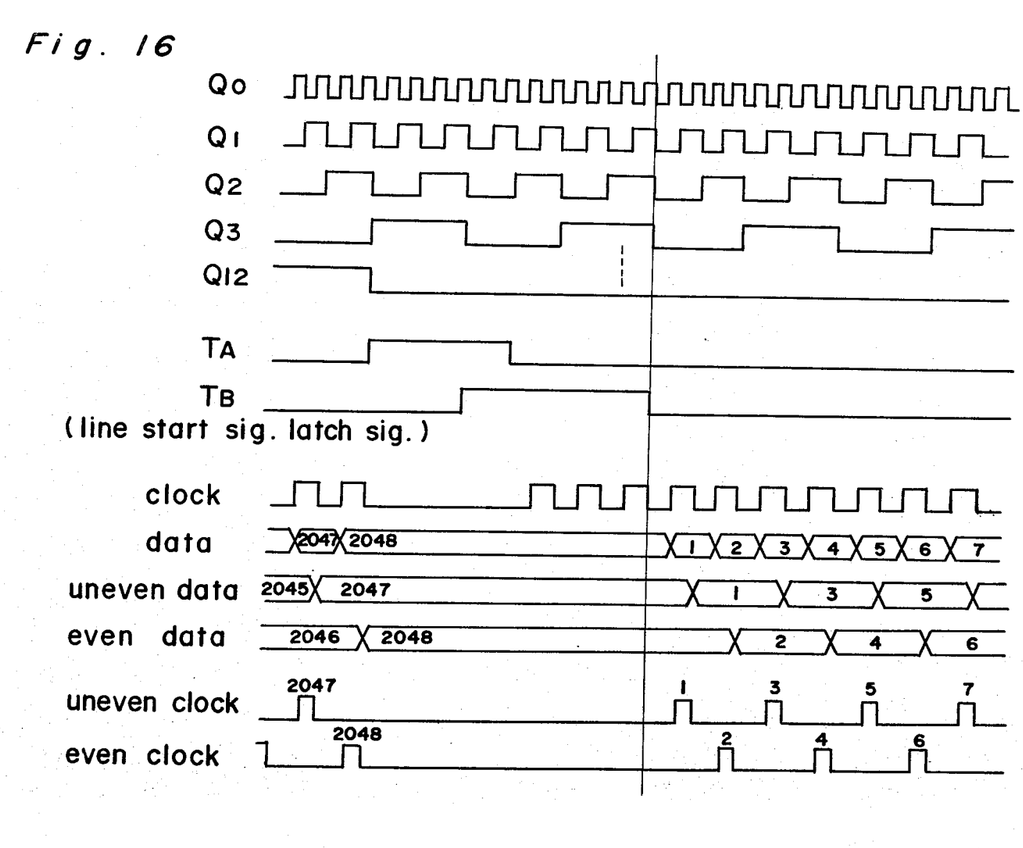
FIG. 16 is a waveform diagram showing the signals shown in FIG. 13.

FIG. 6 shows the circuit arrangement of the fluorescence generation tube 1 and the driving ICs 2. The conductor patterns 19 extend from the light emission segments 18 arranged along the longitudinal direction of the fluorescence generation tube 1, and the conductor patterns 19u assigned uneven number light emission segments 18u from the leftmost end extend upwardly in the drawing while the conductor patterns 19e assigned even number light emission segments 18e from the leftmost end extend downwardly in the drawing. Each of the driving ICs 2 surrounded by the one-dot chain line in FIG. 6 comprises shift registers 2a having sixteen memory stages, sixteen latch circuits 2b, sixteen driver circuits 2c and sixteen ballast resistances 25 as shown in FIG. 16. The uneven number driving ICs 2 in the upper part in FIG. 6 are so connected with a plurality of uneven number conductor patterns 19u as to control a plurality of (e.g., sixteen) uneven number light emission segments 18u, while even number driving ICs 2e in the lower part in FIG. 6 are connected with a plurality of even number conductor patterns 19e. The cathode filaments 20 are heated by an AC power source of about 20 KHz while the grids 21 are applied with a DC voltage of +5 V.

Image signals corresponding to the uneven number clock (referred to as uneven number image data) supplied through the clock interface circuit 3 are transmitted to shift registers (1)-(3)-. . . -(2n-1) in the uneven number driving ICs 2 by the timing of uneven number clock signals while even number data are transmitted to shift registers (2)-(4)-. . . -(2n) in the even number driving ICs 2 by the timing of even number clock signals. Upon input of the image data into the shift registers 2a, the contents of the shift registers 2a are taken in the latch circuits 2b by the latch signal fed from the clock interface circuit 3, whereby the driver circuits 2c are operated to raise the voltage of the corresponding light emission segments 18 across the ballast resistance 25 to a positive voltage higher than that of the cathode filaments 20 so that the light emission segments 18 emit the light. A rightmost end illuminating light emission segment 26 and a leftmost end illuminating light emission segment 27 provided at both ends of the light emission segments 18 are longer than the other light emission segments 18, and are driven by corresponding driving circuits provided outside the circuit arrangement shown in FIG. 6 independently of the other light emission segments 18. The rightmost end illuminating light emission segment 26 and the leftmost end illuminating light emission segment 27 are adapted to remove electric charges in non-recording regions on the photosensitive drum 8 corresponding to both sides of the recording paper 11, and continuously emit the light.

FIG. 7 shows examples of definite sizes of the light emission segments 18, 26 and 27. Each of the light emission segments 18 is 70 μm in width $W_1$ and 80 μm height h and each of the rightmost end illuminating light emission segment 26 and the leftmost end illuminating light emission segment 27 is 10 mm in width $W_0$ and 80 μm in height h, and the length l of the space between each two adjacent light emission segments is 30 μm. With respect to, e.g., an A4 size paper of 210×297 mm (8.27×11.69 in.), 2048 light emission segments are required for obtaining the printing width of 204.8 mm. The lead wires 19 are taken out alternately in the opposite directions as shown, and the uneven number sixteen conductor patterns 19u and the even number sixteen conductor patterns 19e are each connected to one driving IC respectively.

Figure 8:
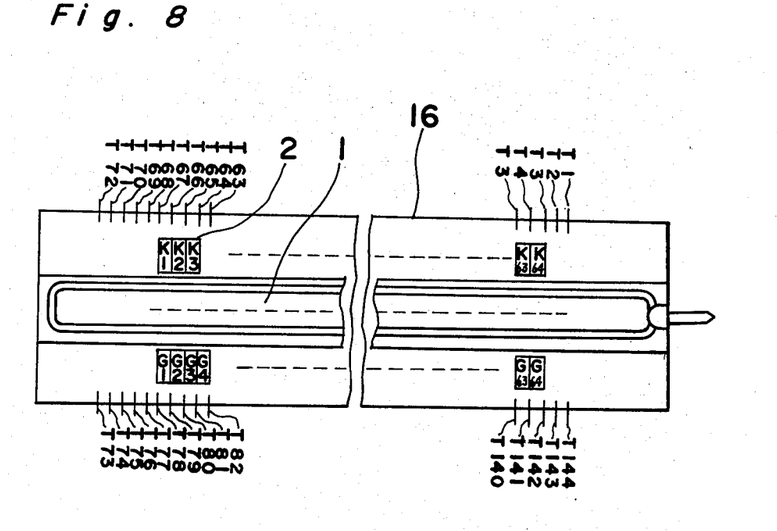
FIG. 8 is a schematic top plan view showing arrangement of the driving ICs and lead terminals.

FIG. 8 shows the arrangement of the ICs 2 disposed on the substrate 16 along the longitudinal sides of the fluorescence generation tube 1 and the arrangement of the lead terminals T1 through T144. Symbols K1, K2, . . . indicate the driving ICs 2 connected to the uneven number conductor patterns 19u of the fluorescence generation tube 1, in which the IC K1 is connected to the first block consisting of 1st to 16th uneven number conductor patterns 19u and the IC K2 is connected to the second block consisting of 17th to 32nd uneven number conductor patterns 19u. The ICs G1, G2, . . . are connected to the even number conductor patterns 19e of the fluorescence generation tube 1 in the similar manner to the ICs K1, K2, . . . . 64 ICs are arranged with respect to both of the uneven number side and the even number side light emission segments, thereby respectively controlling 1024 light emission segments, that is, 2048 light emission segments in all.

Figure 9:
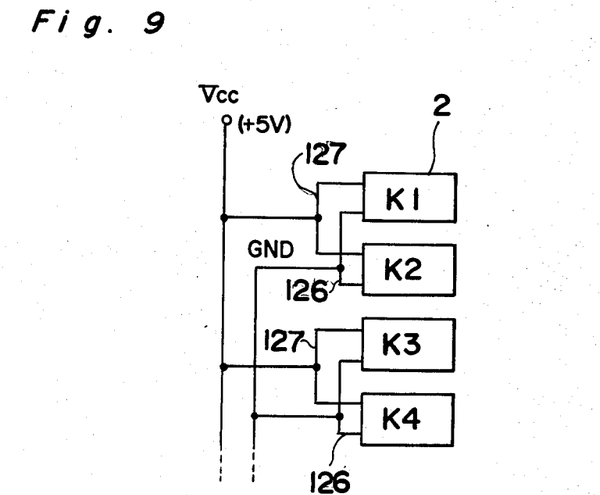
FIG. 9 is a block circuit diagram showing connection of power supplying lead terminals which are connected to the driving ICs and lead terminals for grounding.

A way of input of the various signals into the lead terminals T1 through T144 on the substrate 16 will be more clearly understood by referring to FIG. 6. Two pieces of ICs 2 share one common lead terminal for the power source (+5 V) for the ICs and one common lead terminal GND for grounding. That is, as shown in FIG. 9, ICs K1 and K2 are commonly connected to one lead terminal for +5 V and to one lead terminal for grounding, ICs K3 and K4 are commonly connected to one lead terminal for +5 V and to one lead terminal for grounding, and so on.

Figure 10:
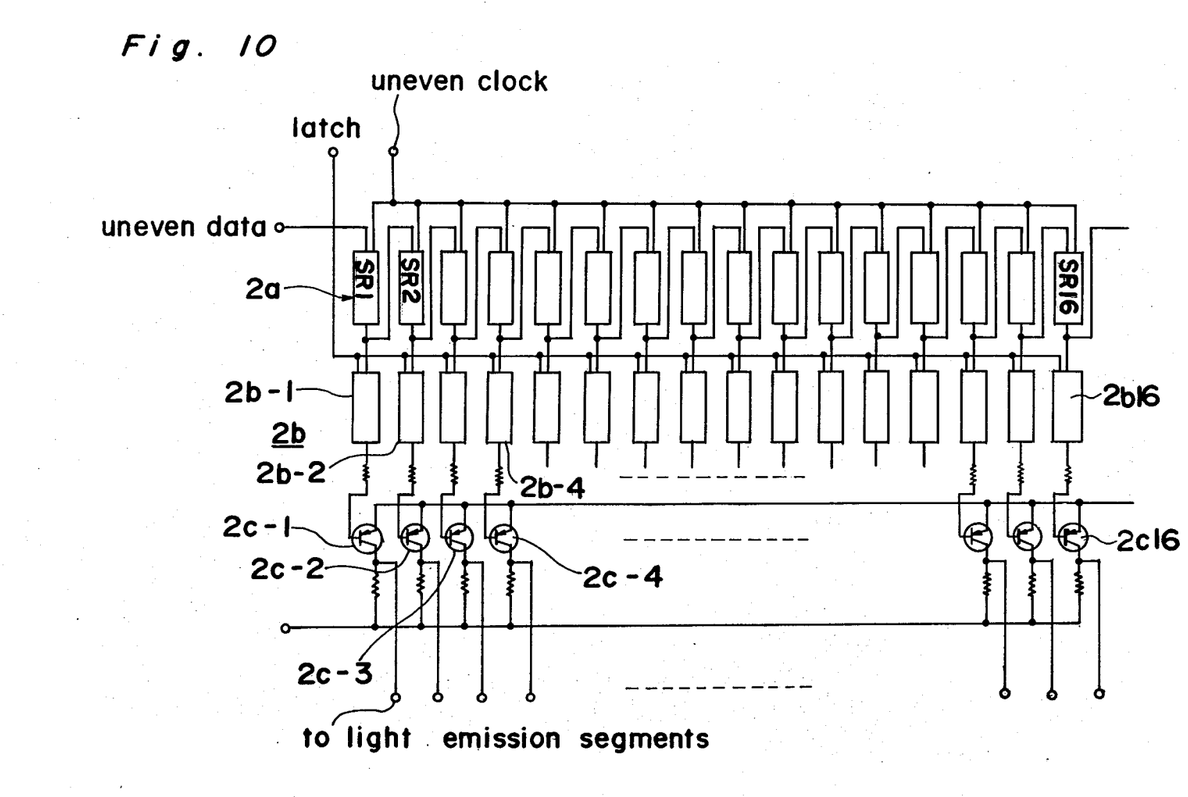
FIG. 10 is a block diagram showing construction of one driving IC.

FIG. 10 shows one uneven number driving IC in detail, in which memory stages SR1 to SR16 of the sixteen shift registers 2a, latch circuits 2b-1 to 2b-16 and sixteen driver transistors 2c-1 to 2c-16 are respectively connected with each other as illustrated in the drawing.

The uneven number data signal representing image information from the data input terminal is shifted in synchronism with the uneven number clock signal through the shift registers in order of SR1–SR2–. . . SR16, and then in the 17th timing of the uneven number clock signal, the data signal is shifted to the shift register of the next uneven number driving IC. Upon transmission of the signal to the shift registers, a latch signal is inputted in a predetermined timing, whereby the contents of the shift registers SR1 to SR16 are taken in the latch circuits 2b-1 to 2b-16. The contents of the latch circuits 2b-1 to 2b-16 control the corresponding driver transistors 2c-1 to 2c-16 to be operated. In the arrangement of FIG. 10, the driver transistors 2c-1 to 2c-16 are turned on when the output level of the corresponding latch circuits 2b-1 to 2b-16 becomes "low⇌ and the base voltage of the driver transistors 2c-1 to 2c-16 is lowered, so that the corresponding light emission segments 18 emit the light. The voltage of the negative power source is appropriately around −25 to −45 V.

The operation of the even number driving ICs is similar to that of the uneven number driving ICs.

Figure 11:
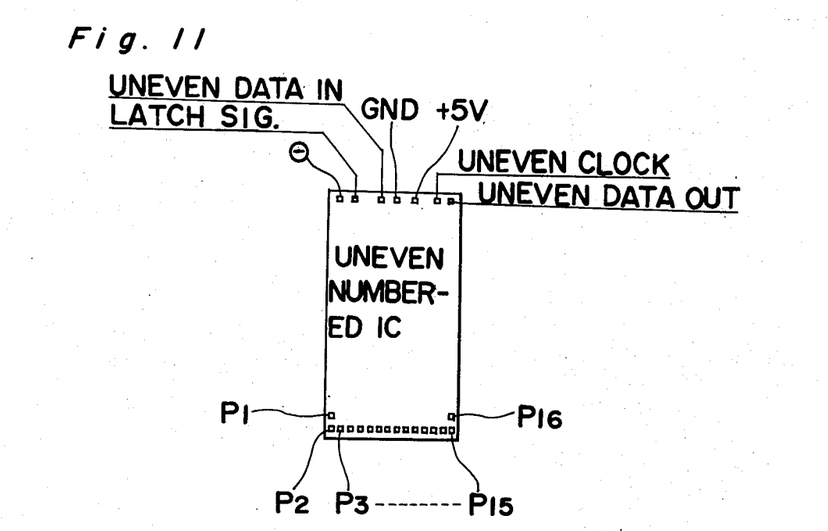
FIGS. 11 and 12 are top plan views respectively showing pin arrangements of the uneven number driving ICs and pin arrangements of the even number driving ICs.
Figure 12:
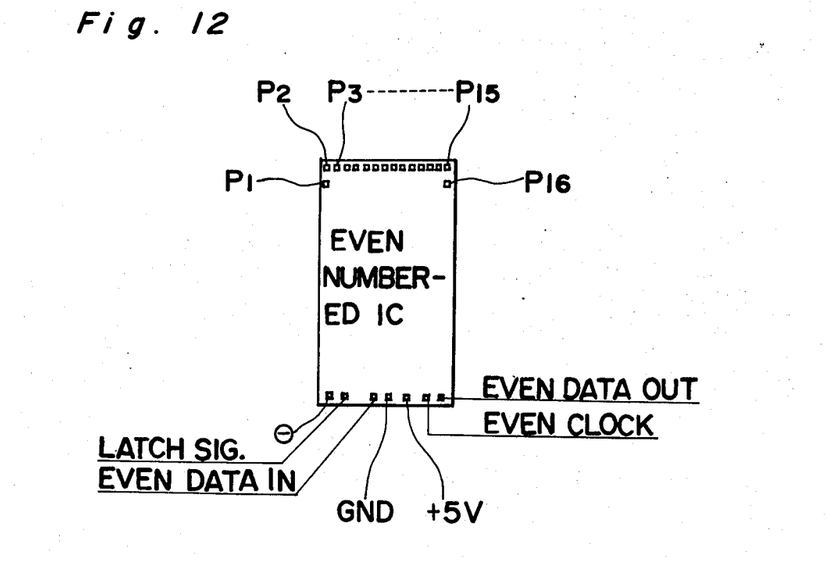

FIG. 11 shows pin arrangement of the uneven number IC and FIG. 12 shows pin arrangement of the even number IC. In either arrangement, the pins in the signal input side are arranged in order of the negative power source, the latch signal, the uneven (or even) number data input, GND, +5 V, the uneven (or even) number clock signal and the uneven (or even) number data output from the left, and the pins in the signal output side are arranged in order of P1, P2, . . . P16 from the left. In other words, the uneven number IC and the even number IC are symmetrical in pin arrangement with each other.

Figure 13:
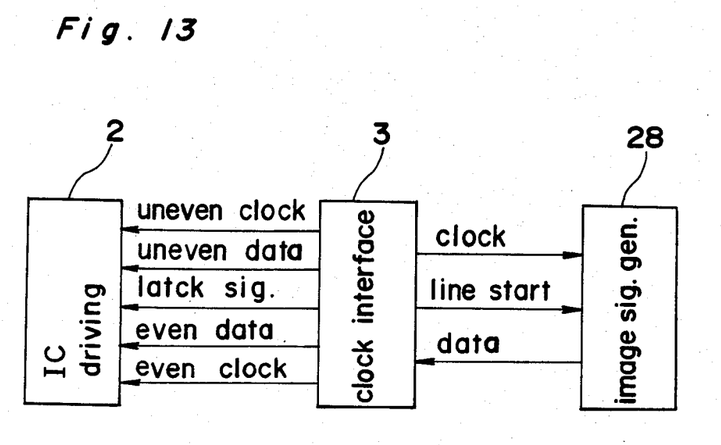
FIG. 13 is an explanation diagram showing receiving and transmission of signals between the driving ICs, a clock interface circuit and an image signal generation circuit.

FIG. 13 illustrates transmission and receiving of signals between the driving IC and the clock interface circuit 3 and between the clock interface circuit 3 and an outside image signal generation circuit 28. When the clock interface circuit 3 generates a line start signal toward the image signal generation circuit 28, the circuit 28 in turn transmits data to the clock interface circuit 3 in the timing of the clock signal. Then the clock interface circuit 3 transmits uneven number data to the shift registers 2a of the uneven number driving ICs in the timing of the uneven number clock signal and even number data to the shift registers 2a of the even number driving ICs 2 in the timing of the even number clock signal, as well as latch signals to the latch circuits of both of the uneven number driving IC and even number driving IC for taking signals from the shift registers into the latch circuits.

Figure 14:
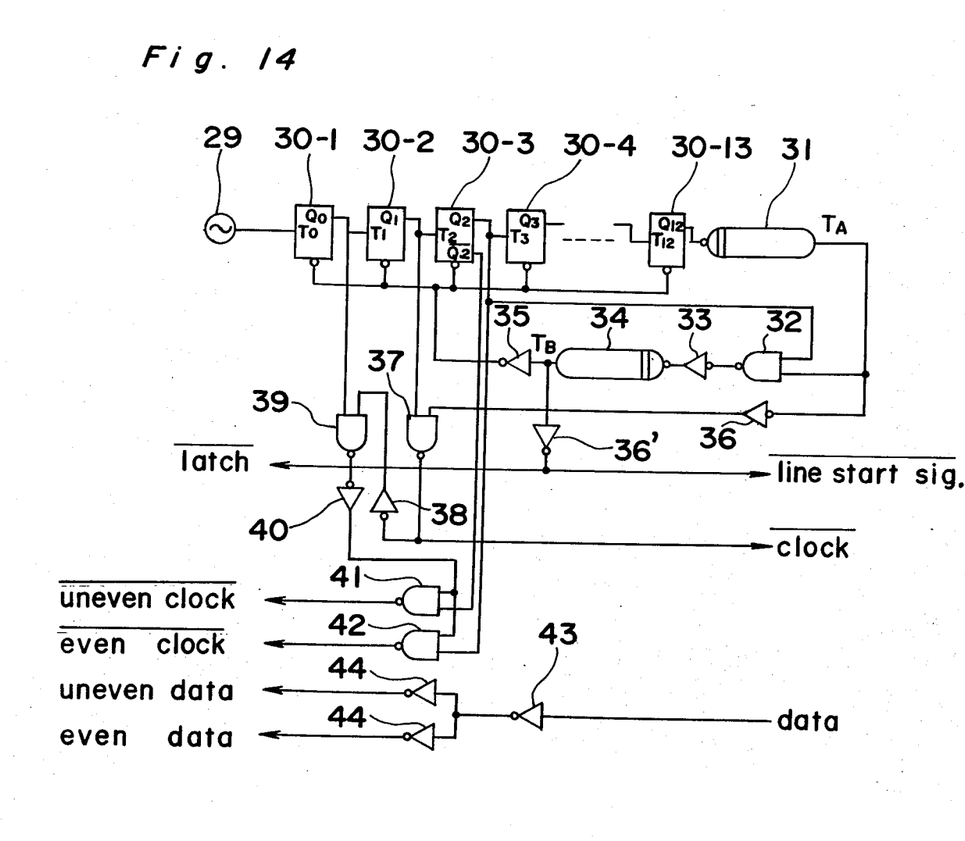
FIG. 14 is a block circuit diagram showing the clock interface circuit.

FIG. 14 shows a definite example of the clock interface circuit 3. Thirteen flip-flops 30-1 to 30-13 are so connected in series that the set output of the former step functions as an input to the succeeding step, in which a rectangular wave oscillation circuit or AC power source 29 is connected to the input terminal of the flip-flop 30-1 of the front step and a monostable multivibrator 31 is connected to the set output Q12 of the flip-flop 30-13 of the last step. The output $T_A$ from the monostable multivibrator 31 and the set output Q2 from the third step flip-flop 30-3 are inputted into a NAND gate 32, whose output is connected through an inverter 33 with a monostable multivibrator 34. The output $T_B$ from the monostable multivibrator 34 is connected to the clock terminals of the flip-flops 30-1 to 30-13 through an inverter 35, and further, the output $T_B$ from the monostable multivibrator 34 is outputted through an inverter 36' as an inverted latch signal and an inverted line start signal. A NAND gate 37 is connected to receive the output $T_A$ from the monostable multivibrator 34 through an inverter 36 and the set output $Q_1$ from the second step flip-flop 30-2 so that the output from the NAND gate 37 acts as an inverted clock signal. Further, a NAND gate 39 is connected to receive the output from the NAND gate 37 through an inverter 38 and the set output $Q_0$ from the first step flip-flop 30-1 while a NAND gate 41 is connected to receive the output from the NAND gate 39 through an inverter 40 as an inverted signal and the reset signal $\overline{Q_2}$ from the third step flip-flop 30-3 so that the output from the NAND gate 41 acts as an inverted uneven number clock signal. A NAND gate 42 is connected to receive the output from the NAND gate 39 through the inverter 40 and the set output $Q_2$ from the third step flip-flop 30-3 so that the output from the NAND gate 42 acts as an inverted even number clock signal.

The data are outputted through two-step inverters 43 and 44 as uneven number data and even number data.

Figure 15:
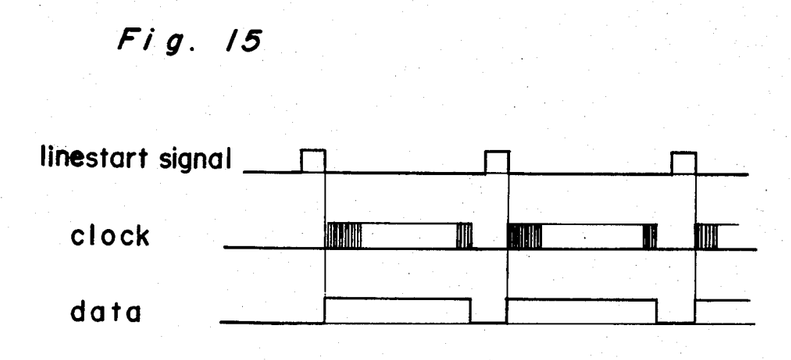
FIG. 15 is a waveform diagram showing signals transmitted between the clock interface circuit and the image signal generation circuit.

Explanation is now made on receiving and transmission of the signals shown in FIG. 13 by the clock interface circuit 3 of FIG. 15 with reference to the waveform diagrams shown in FIGS. 14 and 16. In this case, reproduction is made on the recording region of 204.8 mm × 294.8 mm of an A4 size paper utilizing the fluorescence generation tube 1 having the light emission segments 18 of the sizes as shown in FIG. 7.

When, in FIG. 14, the level of the line start signal transmitted from the clock interface circuit 3 to the image signal generation circuit 28 is lowered, a clock signal is generated whereby the data are transmitted in the timing of this clock signal. 2948 line start signals are required for completion of reproduction on one A4 size recording paper, and each line requires 2048 clock signals. Assuming that the recording paper is fed at the velocity of 50 mm/sec., the period of the clock signal is about 0.9 $\mu$sec.

Referring to FIG. 16, symbols $Q_0$ to $Q_{12}$ respectively indicate the set output signals of the flip-flops 30-1 to 30-13 and symbols $T_A$ and $T_B$ respectively indicate the output signals from the monostable multivibrators 31 and 34, and the signal $T_B$ is turned to a line start signal and a latch signal. When the level of the line start signal $T_B$ is lowered, the data are transmitted from the image signal generation circuit 27 to the clock interface circuit 3 in the timing of rise of the clock signal. The clock interface circuit 3 takes in the data in the timing of lowering of the clock signal, to separate the same into uneven number data and even number data. Then the clock interface circuit 3 outputs the uneven number data and the even number data toward the shift registers of the driving ICs so that the uneven number shift registers receive uneven number data in the timing of the uneven number clock signals and the even number shift registers receive even number data in the timing of even number clock signals, whereby 2048 clock signals are generated and the levels of the outputs $T_A$ and $T_B$ from the monostable multivibrators 31 and 34 are raised. Then when the level of the signal $T_B$ is lowered next time, the data inputted into the shift registers are taken into the latch circuits, so that the light emission segments 18 emit the light by the contents of the data. Further, by lowering of the level of the signal $T_B$, data of the next line are transmitted from the image signal generation circuit 28 to the clock interface circuit 3. This operation is repeated 2948 times for reproduction on the A4 size paper.

When an image smaller than the A4 size is to be reproduced, parts of the light emission segments that are not used for the reproduction of the image may be adjusted to continuosly emit the light together with the rightmost end illuminating segment 26 and the leftmost end illuminating segment 27, so as to de-energize the non-recording regions.

The electrostatic recording apparatus as hereinabove described is simple in maintenance and assembling, and further, the recording head thereof can be made small-sized since the driving ICs are integrally provided with the light emission segments on the same substrate. In addition, since the conductive patterns are formed on the substrate for the light emission segments, they can be simultaneously processed in a manufacturing process, leading to decrease in the wire connecting portions and improvement in production yields. Further, since the uneven number conductor patterns and the even number conductor patterns are taken out in the opposite directions from the light emission segments of the fluorescence generation tube, so that the uneven number conductor patterns and the even number conductor patterns are separately controlled in groups, whereby the driving circuits for both groups of the light emission segments may symmetrically constructed with respect to the line of the light emission segments, simplifying the circuit arrangement for controlling the application of the image signal to the respective light emission segments.

In the electrostatic recording apparatus for forming images by using a fluorescence generation tube in which the light emission segments are arranged in a line, the following advantages can be attained by utilizing as side eraser means light emission segments which are identical in characteristics with the image-recording light emission segments:

(1) Since side-erasing light emission segments are provided in the same fluorescence generation tube as the image-recording light emission segments and can be manufactured simultaneously therewith, the manufacturing cost can be remarkably saved in comparison with the conventional devices in which both groups of the light emission segments are separately manufactured.

(2) The side-erasing light emission segments can be manufactured to have the same characteristics such as light emission wavelength or the quantity of the light emission as the image-recording light emission segments, so that provision of the side-erasing light emission segments will exert no influence upon setting of conditions such as charging and erasing of the photo-sensitive material for image forming.

On the other hand, the following advantages can be attained by making the light emission segments for side erasing at both ends longer than the other light emission segments for fcrming images and driving the side-erasing light emission segments independently of the image-forming light emission segments:

(1) The image-recording light emission segments can be provided within the printing region alone to minimize the number of the light emission segments, whereby the number of the driving ICs may be reduced to save the cost.

(2) The length of the side-erasing light emission segment can be optionally determined. On the contrary, if the side-erasing portions are to be constructed by light emission diodes, the side eraser means must be formed by dot arrays, resulting in an expensive cost and complicated adjustment.

In addition, since the IC tips are so constructed that conductor patterns for supplying a predetermined power source are forxed under the IC tips bonded onto the substrates and the predetermined power source is supplied to the substrates of the IC tips, the following effects can be attained:

(1) Since the predetermined power supplying conductor patterns are formed under the IC tips, the space for the conductor patterns for inputting and outputting signals and supplying the power source can be saved to be narrower than that of the conventional device, thereby enabling the apparatus mounted with the IC tips to be small-sized, and further simplifying electrical insulation between adjacent IC tips.

(2) Heat dissipation of the IC tips is improved since the wide metallic patterns are arranged under the IC tips.

(3) Supplying of the predetermined power source through the wide conductor patterns arranged under the IC tips enables application of a large current which is larger in comparison with that for the conventional device. This is an especially useful effect for an apparatus requiring a large current such as that shown in the embodiment.

(4) The manufacturing process of the IC tips can be simplified since the substrates for the IC tips are not necessarily isolated.

As many apparently widely different embodiments of this invention may be made without departing from the spirit and scope thereof, it is to be understood that the invention is not limited to the specific embodiments thereof except as defined in the appended claims.

What is claimed is:

1. An electrostatic recording apparatus which comprises:
    a fluorescence generation tube having a plurality of small-sized light emission segments aligned on a substrate;
    an image-forming optical system for focusing light emitted from said light emission segments onto the surface of a photosensitive member and forming an electrostatic image on said surface of the photosensitive member; and
    a plurality of driving circuits for controlling light emission of the light emission segments in response to image signals fed thereto.

2. The electrostatic recording apparatus as defined in claim 1, wherein said fluorescence generation tube further includes a face glass for covering said light emission segments, a plurality of anode members provided correspondingly with said light emission segments and a plurality of conductor lines deposited on said substrate and connected with said anode members, said conductor lines extending out of the face glass, the driving circuits are bonded on said substrate by wire bonding with said conductor lines, and said face glass on the substrate are disposed confront to the image-forming optical system.

3. The electrostatic recording apparatus as defined in claim 1, further comprising a face glass of the fluorescence generation tube provided for covering said light emission segments, and the face glass functions as a filter for controlling the wavelength range of the transmitted light.

4. A controlling device for an electrostatic recording apparatus which comprises a fluorescence generation tube having a plurality of small-sized light emission segments arranged in a line on a substrate, an image-forming optical system for focusing the light emitted from the light emission segments on a surface of a photosensitive member and forming an electrostatic image on the surface of the photosensitive member and a plurality of driving circuits for controlling light emission of the light emission segments in response to image signals, said controlling device being characterized in that conductor lines of uneven number light emission segments and conductor lines of even number light emission segments are taken out alternatively in the opposite directions with respect to the line of the light emission segments for separately controlling and driving the uneven number light emission segments and the even number light emission segments, and the driving circuits for the respective light emission segments are formed symmetrical with respect to the line of the light emission segments.

5. The controlling device for the electrostatic recording apparatus as defined in claim 4, wherein said light emission segments and the driving circuits are formed on the same substrate.

6. The controlling device for the electrostatic recording apparatus as defined in claim 4, wherein a plurality of said driving circuits are arranged in parallel.

7. The controlling device for the electrostatic recording apparatus as defined in claims 4, 5 or 6, wherein said conductor lines are formed on the same substrate as the light emission segments by vacuum evaporation.

8. An electrostatic recording apparatus which comprises:
    a fluorescence generation tube having a plurality of small-sized light emission segments arranged in a line on a substrate;
    an image-forming optical system for focusing the light emitted from the light emission segments on a surface of a photosensitive member, and forming an electrostatic image on the surface of the photosensitive member;
    a plurality of integrated circuits for driving said light emission segments for controlling each light emission of the light emission segments in response to image signals; and
    a plurality of conductor patterns formed on said substrate by thin-layer patterns being connected to said integrated circuits by wire bonding for supplying an electric power to the integrated circuits.

9. An electrostatic recording apparatus which comprises:
    an optical signal generation means consisting of a fluorescence generation tube having a plurality of highly-luminant small-sized light emission segments arranged in at least one line on a substrate, an image-forming optical system for focusing the light emitted from the light emission segments on the surface of a photosensitive member and a plurality of driving circuits for controlling light emission of the light emission segments in response to image signals;
    an optical means for forming an electrostatic image on the surface of the photosensitive member; and
    a control means for driving and controlling at least one light emission segment arranged in at least one end portion of the line of the light emission segments independently of the light emission control of the remaining light emission segments by said image signals, thereby deenergizing the electric charge on the surface of the photosensitive member in such a region corresponding to the end portion existing outside and along said recorded image.

10. The electrostatic recording apparatus as defined in claim 9, wherein the line of the light emission segments is provided in correspondence to the maximum image recording width and further includes at least one light emission segment which is longer than the other light emission segments and formed in at least one end portion of the line of the light emission segments, said longer segment being driven by said control means so as to de-energize the electric charge on the surface of the photosensitive member at said region along the recorded image.

11. The electrostatic recording apparatus as defined in claim 2, wherein said driving circuits comprise a plurality of IC tips bonded at the sides having substrates to said substrate of the fluorescence generation tube on which conductor lines are formed, the input and output terminals of the IC tips being connected to said conductor patterns by wire bonding, at least one of said conductor lines being formed on said substrate in regions to which the IC tips are bonded for supplying a power source with the electric potential of the substrates of the IC tips being that of said power source.

12. The electrostatic recording apparatus as defined in claim 11, wherein the substrates of the IC tips are bonded to the substrate of the fluorescence generation tube through an insulating material.

13. The electrostatic recording apparatus as defined in claim 11, wherein the substrates of the IC tips are bonded to the substrate of the fluorescence generation tube through a conductive material.

14. In an electrostatic recording apparatus having a photosensitive member for recording information such as electronic data and transmitting it to a medium such as paper, the improvement comprising:
an elongated fluorescent generation tube extending substantially across the width of the photosensitive member and relatively movable thereto, the tube having a plural of light emitting segments forming a substantially continuous display line across the image recording width of the photosensitive member;
means for selectively activating the light emitting segments, and
timing means to energize and de-energize the light emitting segments in coordination with the relative movement of the photosensitive member.

15. The invention of claim 14 wherein the means for selectively activating the light emitting segments include means for displaying predetermined data while setting a subsequent line of information data in storage for the next activation of the light emitting segments by the timing means.

16. The invention of claim 14 further including optical means for transmitting the light from the light emitting segments to the photosensitive member.

* * * * *